United States Patent
Hu et al.

(10) Patent No.: US 9,294,244 B2
(45) Date of Patent: Mar. 22, 2016

(54) METHOD AND APPARATUS FOR CHANNEL ESTIMATION AND DETECTION IN MIMO SYSTEM

(71) Applicant: Telefonaktiebolaget LM Ericsson (publ), Stockholm (SE)

(72) Inventors: Yang Hu, Beijing (CN); David Astely, Bromma (SE); Xinghua Song, Beijing (CN); Jianfeng Wang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/520,465

(22) Filed: Oct. 22, 2014

(65) Prior Publication Data

US 2015/0049830 A1 Feb. 19, 2015

Related U.S. Application Data

(63) Continuation of application No. 13/520,880, filed as application No. PCT/CN2010/000045 on Jan. 12, 2010, now Pat. No. 8,908,789.

(51) Int. Cl.
*H04L 1/02* (2006.01)
*H04L 5/00* (2006.01)
(Continued)

(52) U.S. Cl.
CPC .............. *H04L 5/005* (2013.01); *H04B 7/0413* (2013.01); *H04L 5/0023* (2013.01); *H04L 25/0224* (2013.01); *H04L 5/0016* (2013.01); *H04L 25/0226* (2013.01)

(58) Field of Classification Search
CPC ... H04L 5/005; H04L 25/0016; H04L 23/123; H04L 25/0226

USPC .......... 375/267, 260, 295, 340; 370/328, 329
See application file for complete search history.

(56) References Cited

U.S. PATENT DOCUMENTS 8,537,766 B2 * 9/2013 Hu et al. ................ 370/329
2009/0279447 A1* 11/2009 Mehta et al. ............ 370/252
(Continued)

FOREIGN PATENT DOCUMENTS

JP 2013517646 A 5/2013
JP 2013517661 A 5/2013
(Continued)

OTHER PUBLICATIONS

"Downlink DM-RS Structure for Rank 5-8 in LTE Advantage", R1-094910 3GPP TSG RAN WG1 Meeting #59 to NTT DoCoMO, published Nov. 9, 2009.*
(Continued)

*Primary Examiner* — Khai Tran
(74) *Attorney, Agent, or Firm* — Patent Portfolio Builders PLLC

(57) ABSTRACT

The present invention provides a method for performing channel estimation and detection in a Multiple-Input-Multiple-Output (MIMO) system, including: generating a demodulation reference signal, DM-RS, pattern for an extended cyclic prefix (CP); and estimating and detecting channel performance based on the generated DM-RS signal pattern. The DM-RS pattern supports from rank 1 to rank 8 patterns for 8 layer transmission. A transmitter, a receiver and a system thereof are also provided. The solution of the present invention improves channel estimation accuracy, saves channel estimation implementation and implementation complexity at terminals.

10 Claims, 4 Drawing Sheets

(51) Int. Cl.
*H04B 7/04* (2006.01)
*H04L 25/02* (2006.01)

(56) References Cited

U.S. PATENT DOCUMENTS

| | | | |
|---|---|---|---|
| 2010/0067464 A1 | 3/2010 | Higuchi | |
| 2010/0074343 A1* | 3/2010 | Gaal et al. | 375/259 |
| 2010/0195615 A1 | 8/2010 | Lee et al. | |
| 2011/0085519 A1* | 4/2011 | Koivisto et al. | 370/335 |
| 2012/0275414 A1 | 11/2012 | Hu et al. | |

FOREIGN PATENT DOCUMENTS

| | | |
|---|---|---|
| WO | 2008114724 A1 | 9/2008 |
| WO | 2011087252 A2 | 7/2011 |

OTHER PUBLICATIONS

Japanese Office Action in corresponding Japanese Application No. 2012-547419 dated Mar. 31, 2014.
Ericsson, ST-Ericsson, 3GPP TSG-RAN WG1 #59, "On DM RS for extended CP," R1-094434, Jeju, Korea, Nov. 9-13, 2009.
MCC Support, 3GPP TSG RAN WG1 Meeting #59, "Final Report of 3GPP TSG RAN WG1 #58bis v1.0.0 (Miyazaki, Japan, Oct. 12-16, 2009)," R1-094421, Jeju, South Korea, Nov. 9-13, 2009.
3GPP TSG RAN WG1 #58bis WG2 #67bis & WG3 #65bis, Nov. 9-13, 2009.
3GPP TS 36.211 V8.6.0 Technical Specification, "3rd Generation Partnership Project; Technical Specification Group Radio Access Network; Evolved Universal Terrestrial Radio Access (E-UTRA); Physical Channels and Modulation (Release 8)," Mar. 2009.
Notice of Allowance received Aug. 8, 2014 in related JP Application No. 2012-547419.
Catt et al., Downlink Demodulation RS Design, 3GPP TSG RAN WG1 meeting #58, R1-093519, Aug. 24-28, 2009, Shenzhen, China.
Ericsson et al., DM RS design for extended CP, 3GPP TSG_RAN WG1 #59bis, R1-100047, Jan. 18-22, 2010, Valencia, Spain.
ZTE, 3GPP TSG RAN WG1 Meeting #59, "Investigation for DMRS of rank 5-8," R1-094751, Jeju Korea, Nov. 13, 2009.
Ericsson, 3GPP TSG RAN WG1 Meeting #59, "On Rel-1 0 OM RS design for rank 5-8," R1-094438, Jeju Korea, Nov. 13, 2009.
LG Electronics, 3GPP TSG RAN WG1 Meeting #58bis, "DM-RS Design for rank 5-8," R1-094784, Jeju Korea, Nov. 13, 2009.
NTTDOCOMO, 3GPP TSG RAN WG1 Meeting #59, "Downlink DM-RS Structure for Rank 5-8 in LTE-Advanced" R1-094910, Jeju Korea, Nov. 13, 2009.
Qualcomm Europe, 3GPP TSG RAN WG1 Meeting #59, "UE-RS Patterns for ranks 5 to 8," R1-094869, Jeju Korea, Nov. 13, 2009.
Research in Motion, UK Limited. 3GPP TSG RAN WG1 Meeting #59, "Downlink DM-RS Design Considerations for Rank 5-8 in LTE-A," R1-094454, Jeju Korea, Nov. 13, 2009.
Huawei. 3GPP TSG RAN WG1 Meeting #59, "DMRS discussion for rank 5-8," R1-094705, Jeju Korea, Nov. 13, 2009.
Hitachi Ltd. 3GPP TSG RAN WG1 Meeting #59, "Further Consideration on Downlink DM-RS Design for Rank 5-8 in LTE-Advanced," R1-095004, Jeju Korea, Nov. 13, 2009.
China Patent Office, Int'l Search Report in PCT/CN2010/000045, Oct. 14, 2010.
Qualcomm Europe, UE-RS Patterns for Rank 3-4, Tdoc R1-094868, Nov. 9, 2009, pp. 1-2, 3GPP TSG RAN WG1 Meeting #59, Jeju, KR.
Chinese Office Action in corresponding Chinese Application No. 201080061326.5 issued Feb. 25, 2015.
First Office Action issued by State Intellectual Property Office, P.R. China, dated Aug. 5, 2014, in related Chinese Patent Application No. 201080061326.5.
Indonesian Office Action in corresponding Indonesian Application No. HIKI-3-HI.05.02.01 7209 dated Nov. 11, 2014.
Japanese Office Action in corresponding Japanese Application No. 2014-181519 dated Oct. 15, 2015.
Ericsson, ST-Ericsson; "On Rel-10 DM RS design for rank 5-8"; 3GPP TSG-RAN WG1 #59, R1-094438; pp. 1-5; Nov. 9-13, 2009; Jeju, Korea.
Nokia, Nokia Siemens Networks; "Extended CP UE-specific reference symbol design for dual-layer beamforming"; 3PP TSG RAN WG1 Meeting #69; R1-094638; pp. 1-6; Nov. 9-13, 2009; Jeju, Korea.
Ericsson, ST-Ericsson; "On Rel-10 DM RS design for Rank 3-4"; 3GPP TSG-RAN WG1 #59; R1-094925; pp. 1-6; Nov. 9-13, 2009; Jeju, Korea.
Catt; "DM RS design in DwPTS and extended CP"; 3GPP TSG RAN WG1 Meeting #58b; R1-094121; pp. 1-20; Oct. 12-16, 2009; Miyazaki, Japan.

* cited by examiner

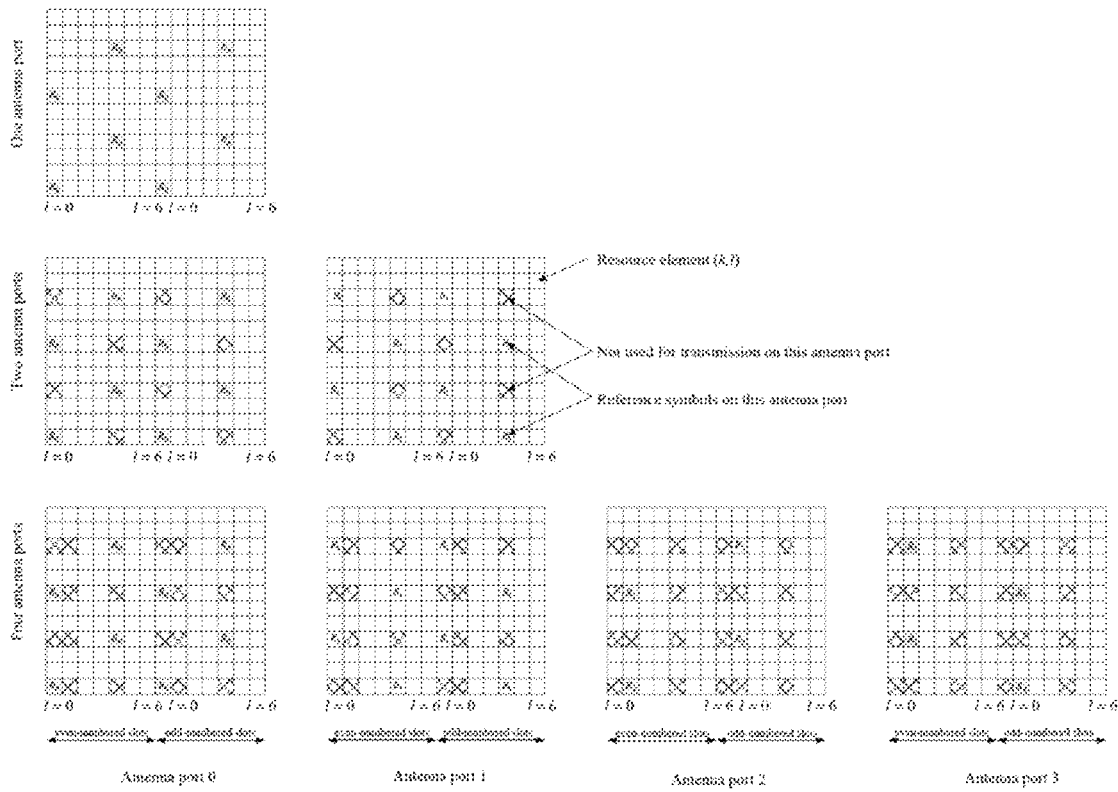
Figure 1 Up to 4 downlink cell-specific reference signals (normal CP) in prior art
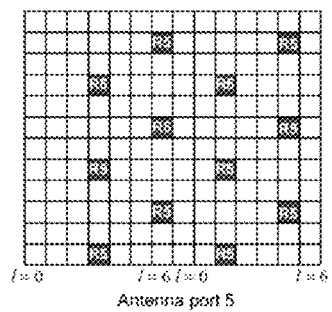
Figure 2 One downlink UE-specific reference signal (normal CP) in prior art

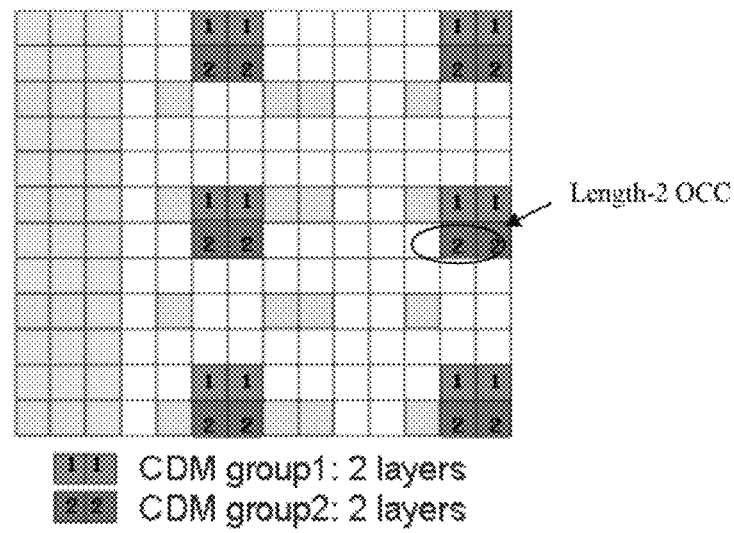
Figure 3  up to 4 layers DM-RS pattern for normal CP in prior art
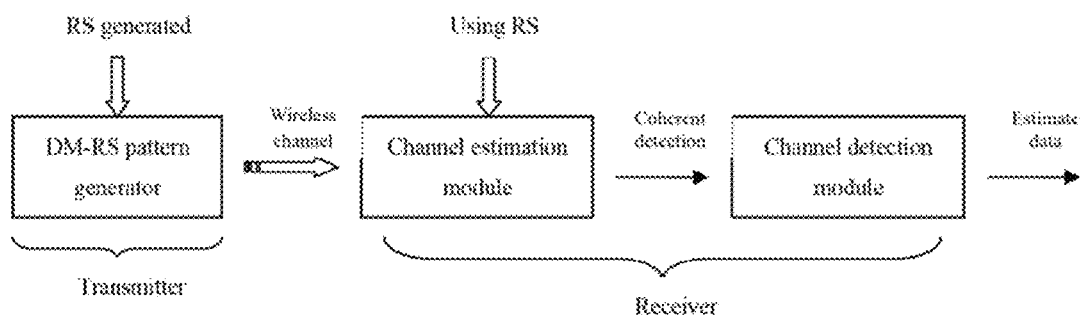
Figure 4  A wireless system with DM-RS pattern

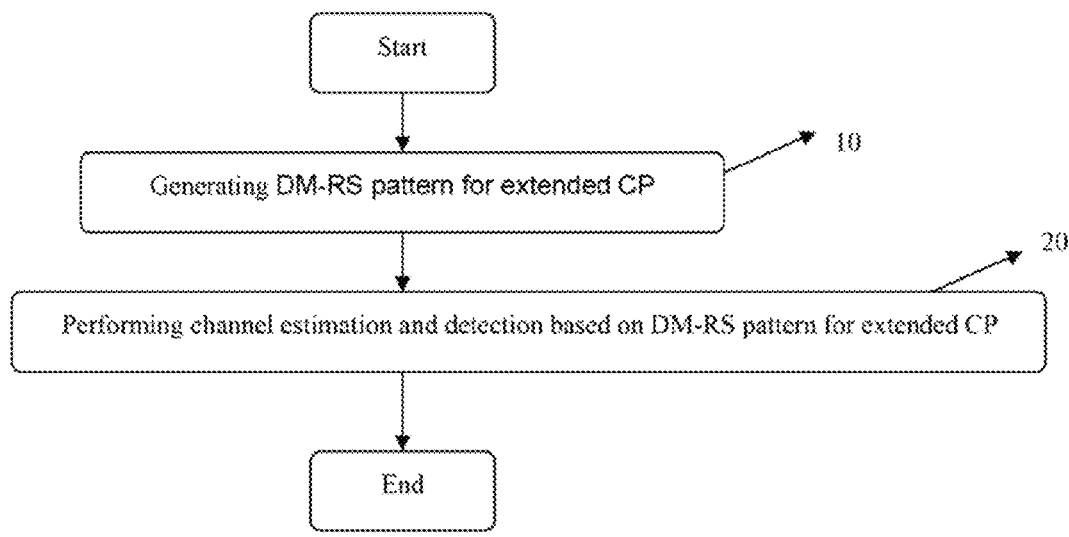
Figure 5   Channel estimation and detection method based on DM-RS pattern
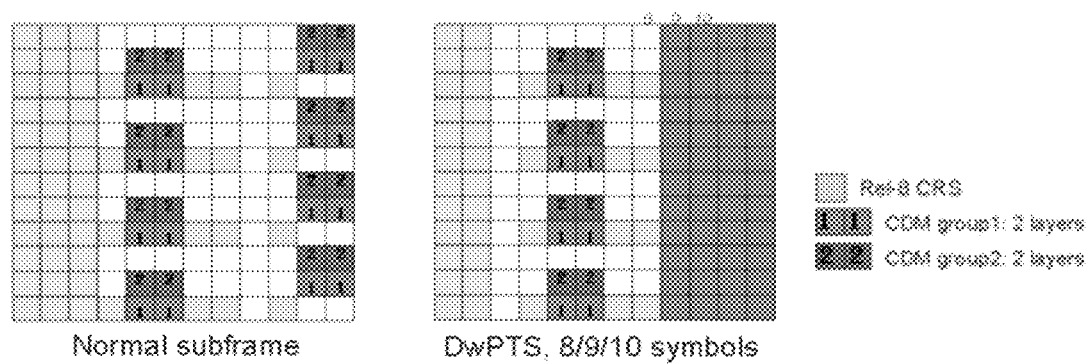
Figure 6   Extended CP Rank 1-4 pattern for both normal subframe (left) and DwPTS (right)

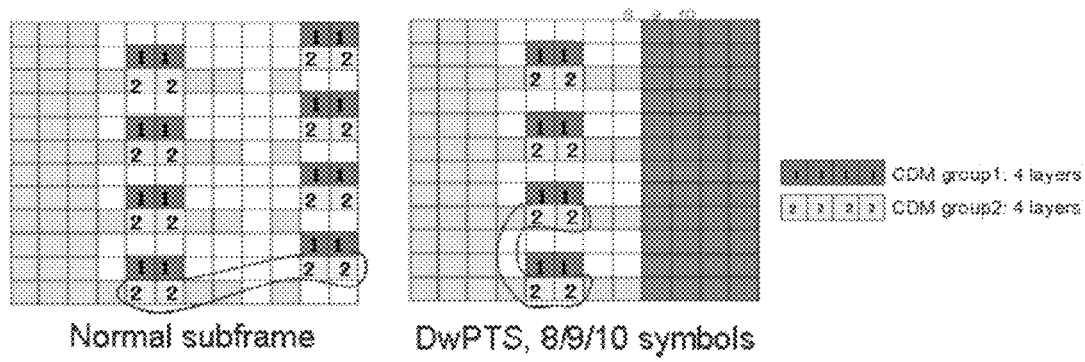
Figure 7 Extended CP rank 5-8 pattern: Option-1 with OCC=4
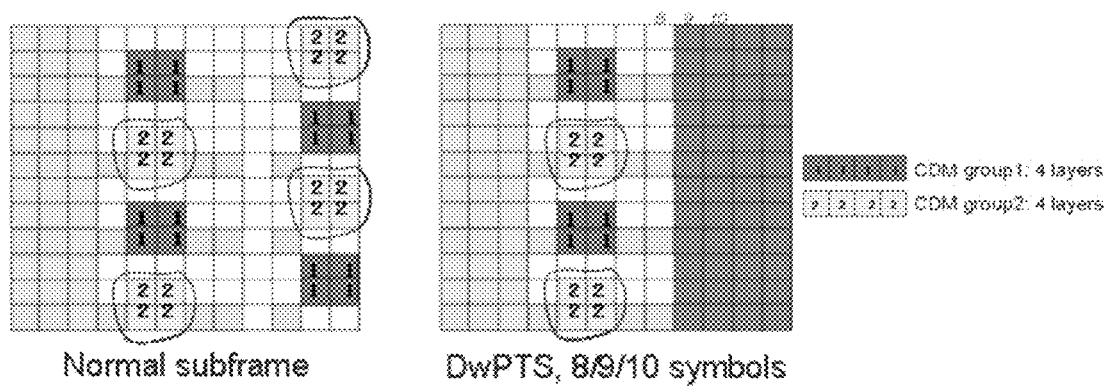
Figure 8 Extended CP rank 5-8 pattern: Option-2 with OCC=4
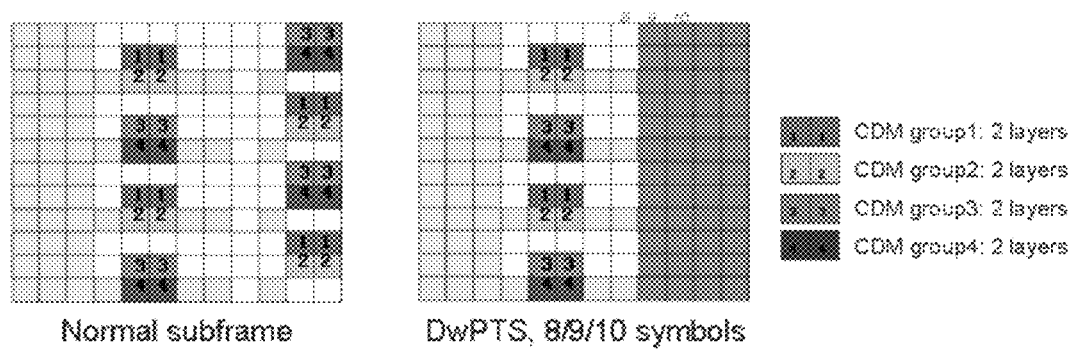
Figure 9 Extended CP rank 5-8 pattern: Option-3 with OCC=2

METHOD AND APPARATUS FOR CHANNEL ESTIMATION AND DETECTION IN MIMO SYSTEM

CROSS-REFERENCE TO RELATED APPLICATIONS

This application is a continuation of U.S. patent application Ser. No. 13/520,880, filed on Jul. 6, 2012, entitled "Method and Apparatus for Channel Estimation and Detection in MIMO System", which is related to, and claims priority from, International Application No. PCT/CN2010/000045, filed on Jan. 12, 2010, entitled "Method and Apparatus for Channel Estimation and Detection in MIMO System", the disclosure of which is incorporated here by reference.

FIELD OF THE INVENTION

The present invention relates to field of wireless communication, and more particularly to coherent detection with demodulation reference signal (DM-RS) for the extended cyclic prefix (extended CP) in the Evolved Universal Terrestrial Radio Access (E-UTRA) system, which is also commonly referred to as the Long-Term Evolution (LTE) of the widely deployed WCDMA systems.

BACKGROUND OF THE INVENTION

Long Term Evolution (LTE) is currently under discussion as a next generation mobile communication system of the UMTS system. LTE is a technology for realizing high-speed packet-based communication that can reach high data rates both in the downlink and in the uplink. The 3GPP work on LTE is also referred to as E-UTRAN (Evolved Universal Terrestrial Access Network). In order to support high data rates, LTE allows for a system bandwidth of up to 20 MHz. LTE is also able to operate in different frequency bands and can operate in at least Frequency Division Duplex (FDD) and Time Division Duplex (TDD). The modulation technique or the transmission scheme used in LTE is known as OFDM (Orthogonal Frequency Division Multiplexing). LTE-advanced can be viewed as a future release of the LTE standard and since it is an evolution of LTE, backward compatibility is important so that LTE-advanced can be deployed in spectrum already occupied by LTE. In both LTE and LTE-advanced radio base stations known as eNBs or eNodeBs—where e stands for evolved—, multiple antennas with beamforming technology can be adopted in order to provide high data rates to user equipments. Thus, LTE and LTE-advanced are an example of Multiple-Input-Multiple-Output (MIMO) radio systems. Another example of a MIMO based system is Worldwide Interoperability for Microwave Access (WiMAX) system.

As defined in 3GPP LTE, RS is multiplexing with data into OFDM time-frequency grid. In Rel-8, three kinds of downlink reference signals are defined in terms of different functionality, i.e. cell-specific reference signal, UE-specific reference signal and MBSFN reference signal. Here, the first two kinds of reference signals are focused.

Cell-specific reference signals (also called CRS) are responsible for both channel measurement and data demodulation in Rel-8 for the downlink transmission modes except mode 7 (i.e. single layer beamforming). UE terminals will use CRS to calculate Channel Quality Indication/Precoding Matrix Index/Rank Indicator (CQI/PMI/RI) and also do data demodulation by performing channel estimation. Total 4 CRS are defined to support up to 4 layers transmission, i.e. antenna ports 0-3, as shown in FIG. 1 (normal CP only), the detailed description can be found in the standard document, "3GPP TS 36.211 V8.6.0 (2009-03)".

UE-specific reference signals (also called dedicated reference signal, or DRS) are introduced only for the transmission mode 7 in Rel-8, i.e. single layer beamforming. DRS are precoded and share the same precoder as data. In addition, DRS is responsible for channel demodulation only, which means channel estimation for data demodulation will be performed based on DRS. Only single DRS port is defined in Rel-8 to support single layer transmission, i.e. antenna port 5. The DRS pattern for normal CP and extended CP is defined respectively, as shown in FIG. 2 (normal CP only). The detailed description can be found in the standard document, "3GPP TS 36.211 V8.6.0 (2009-03)".

In "3GPP, RAN1__58bis Chairman notes, RAN1 58bis, Oct. 12-16, 2009, Miyazaki, Japan", DM-RS design for normal CP, as shown in FIG. 3, acts as up to four layers DM-RS pattern. Some characteristics are summarized here: total 12 resource elements per layer are agreed as DM-RS overhead (either marked as 1 or 2 in FIG. 3). Two CDM groups (marked as 1 and 2) occupy different subcarriers in frequency domain. Each CDM group uses 6 orthogonal code covers (OCC) with each length of 2 to multiplex up to two layers. This is a non-staggered version, i.e. 1st DM-RS cluster and 2nd DM-RS cluster take the same subcarrier.

In order to fulfill LTE-advanced downlink spectral efficiency, 30 bps/Hz, up to 8 layer transmission should be supported using some kind of advanced antenna configuration, e.g. 8×8 high-order MIMO. If similar design of up to 8 cell-specific reference signals is introduced, system overhead will be inevitably increased and accordingly throughput performance will be decreased seriously. Accordingly, there is a need for generating a DM-RS pattern for extended CP supporting from rank 1 to rank 8 for both normal subframe and Downlink Pilot Time Slot (DwPTS). Based on this consideration, it is proposed CSI-RS (namely cell-specific reference signal) is targeted for channel measurement only while DM-RS (namely UE-specific reference signal) is targeted for channel demodulation only. CSI-RS can be accessed by all UE terminals in a cell and DM-RS can be accessed by the UE only on the allocated resource blocks (RB).

On DM-RS pattern for extended CP, it is known that extended CP is not supported in conjunction with transmission mode 8 (i.e., dual layer beamforming mode). The use of extended CP is expected for channels with larger time dispersion, or equivalently for channels experiencing much more frequency selectivity as compared to channels where normal CP is used, e.g. Vehicular B channel (VehB). Therefore, there is a need for generating a DM-RS pattern for extended CP to guarantee and improving detection performance in such a channel.

In TDD, DwPTS has different length according to different special subframe configurations, which results in quite a lot of designs at UE side. Therefore, there is a need for generating a DM-RS pattern for extended CP to reduce UE implementation complexity.

The pattern designed for normal CP has been accepted well. Some design principles have been settled down. Therefore, there is a need for generating a DM-RS for extended CP which has smooth and close design for extended CP to further save UE implementation and standard effort.

SUMMARY OF THE INVENTION

The present invention provides a method for performing channel estimation and detection in a Multiple-Input-Multiple-Output, MIMO, system, including: generating a demodulation reference signal, DM-RS, pattern for an extended cyclic prefix, CP; and estimating and detecting channel performance based on the generated DM-RS signal pattern. The DM-RS pattern includes rank 5-8 pattern which supports for 8 layer transmission.

The present invention also provides a transmitter including, a demodulation reference signal pattern generator for generating a DM-RS pattern for an extended cyclic prefix. The DM-RS pattern includes rank 5-8 pattern which supports for 8 layer transmission.

In a further aspect of the invention, a receiver is provided including, a channel estimation module, adapted to estimating channel performance by using a demodulation reference signal, DM-RS, pattern for an extended cyclic prefix; and a channel detection module, adapted to detecting coherently by using estimated channel state information, CSI, contained in the DM-RS. The DM-RS pattern includes rank 5-8 pattern which supports for 8 layer transmission.

In another aspect of the invention, a system including the transmitter and the receiver as above is provided.

In conclusion, this invention proposes staggered patterns with a bit higher RS overhead for extended CP than normal CP from rank-1 to rank-8. Channel estimation and detection by using the patterns of the invention with a bit higher RS overhead in frequency domain can provide good capability of capturing fast frequency variations to improve channel estimation accuracy, which is typically suitable to extended CP case. In addition, the patterns of the invention can keep a subset design as much as possible to save channel estimation implementation at terminals. Furthermore, when in a TDD system, the patterns of the invention can save standard effort and implementation complexity as well since a unified pattern is proposed for all DwPTS lengths. The designed patterns can extensively be applied for features, e.g. higher-order MIMO, Multi-user MIMO (MU-MIMO), Coordinated Multipoint Transmission (CoMP) and possibly relaying, etc.

BRIEF DESCRIPTION OF THE DRAWINGS

In the following section, the invention will be described with reference to exemplary embodiments illustrated in the figures, in which:

FIG. 1 shows an exemplary diagram illustrating up to 4 downlink cell-specific reference signals (normal CP) in prior art;

FIG. 2 shows an exemplary diagram illustrating one downlink UE-specific reference signal (normal CP);

FIG. 3 shows an exemplary diagram illustrating up to 4 layers DM-RS pattern for normal CP in prior art;

FIG. 4 shows an exemplary structural diagram illustrating a wireless system with a DM-RS pattern according to an embodiment of the present invention;

FIG. 5 shows a flowchart illustrating a method for channel estimation and detection by using a DM-RS pattern according to an embodiment of the present invention;

FIG. 6 shows an exemplary extended CP rank 1-4 pattern for both normal subframe (left) and DwPTS (right) according to an embodiment of the present invention;

FIG. 7 shows an exemplary extended CP rank 5-8 pattern (option-1) with OCC=4 according to an embodiment of the present invention;

FIG. 8 shows an exemplary extended CP rank 5-8 pattern (Option-2) with OCC=4 according to an embodiment of the present invention; and FIG. 9 shows an exemplary extended CP rank 5-8 pattern (Option-3) with OCC=2 according to an embodiment of the present invention.

DESCRIPTION OF THE EMBODIMENTS

Embodiments of the present invention will be described by referring to the accompanying drawings.

Reference signal (RS), as also called predefined training sequence/signal, is extensively applied in wireless communication systems with the aim to improve detection performance. Namely, in a wireless communication system, RS carried by transmitter is responsible for receiver to do channel estimation. Coherent detection by using the estimated channel state information (CSI) can be applied, which is considered an efficient method to improve performance.

Referring to FIG. 4, a wireless communication system with reference signals includes at least a transmitter and a receiver is provided. RS is predefined between transmitter and receiver. The transmitter includes a DM-RS pattern generator for generating a DM-RS pattern for an extended cyclic prefix; at the receiver, channel estimation is applied first by using RS targeting to do coherent detection for data recovery. The receiver includes a channel estimation module for estimating channel performance by using the DM-RS pattern for an extended cyclic prefix; and a channel detection module for detecting coherently by using estimated channel state information, CSI, contained in the DM-RS. The DM-RS pattern supports from rank 1 to rank 8 for 8 layer transmission.

FIG. 5 shows a method for performing channel estimation and detection in an MIMO system. The method includes the following steps:

In step 10, a demodulation reference signal pattern for an extended cyclic prefix is generated from the DM-RS pattern generator at the transmitter.

In step 20, channel estimation and detection is performed respectively by a channel estimation module and a channel detection module, at the receiver, in dependence on the generated DM-RS signal pattern.

The DM-RS pattern includes rank 5-8 patterns which supports for 8 layer transmission.

Hereinafter, two DM-RS patterns cases, i.e. rank 1-4 pattern and rank 5-8 pattern are provided in detail.

Case 1: Rank 1-4 Pattern

An embodiment of the present invention provides a DM-RS pattern for the support of up to four layers transmission, as shown in FIG. 6. The detection performance of this pattern can be guaranteed for extended CP case. In this figure, 3 or 2 control symbols are given as an example for normal subframe and DwPTS, respectively.

In this patter, the DM-RS overhead of 16 REs per layer is used, which is a bit higher than 12 REs for normal CP (see FIG. 3). 16 REs per layer is selected for making a best tradeoff between channel estimation/detection performance and overhead. This may solve the problem that channel estimation accuracy is degraded because of highly frequency selective fading.

A staggered structure is proposed to further improve performance. This can benefit to detailed channel estimation algorithm, e.g. 2D-MMSE filter method, which is extensively used for DM-RS based transmission modes.

A punctured version of normal subframe is simply proposed for all DwPTS cases, i.e. DwPTS with 8, 9 or 10 OFDM symbols. This can ease UE implementation since only one DM-RS pattern is used for channel estimation when applicable to different DwPTS case. Of course, this is not suitable to the case of DwPTS with 3 OFDM symbols since no data transmission is expected The same as normal CP case, CDM+FDM is basically used to multiplex up to four layers. This maintains good consistency of DM-RS design between normal CP and extended CP. In another word, design principles can be shared to a great extent.

A good subset design is kept since per layer channel estimation is the same regardless of different rank pattern. For instance, layer 1 channel estimation implementation is the same in rank-1 and rank-4 pattern.

Case 2: Rank 5-8 Pattern

Based on this rank 1-4 pattern, three preferred optional DM-RS patterns for rank 5-8 patterns are provided to support up to 8 layer transmission, as shown in FIGS. 7-9. This may give a smooth and simple pattern design.

FIG. 7 shows Option-1 for DM-RS pattern for extended CP where OCC=4. The Option-1 re-uses the resource elements reserved for DM-RS in rank 1-4 pattern, which to some extent eases channel estimation implementation at UE. This option keeps the same characteristics of rank 1-4 pattern, i.e. 16 REs per layer, staggered structure, a subset design and unified pattern for all DwPTS cases. The difference is to use OCC with length of 4 for each CDM group, where OCC is constructed in time-frequency domain for both normal subframe and DwPTS, as shown in FIG. 7. The advantage is to make a soft extension by modifying OCC length from 2 to 4.

For normal subframe, the DM-RS pattern in Option-1 includes 16 REs per layer, and the 16 REs for CDM group 1 includes resource elements at R(i, f) in a radio frame, where f=2, 5, 8, 11 when i=5 or 6, and f=3, 6, 9, 12 when i=11 or 12; for CDM group 2, f=1, 4, 7, 10 when i=5 or 6, and f=2, 5, 8, 11 when i=11 or 12, where i represents the i-th symbol in time-domain direction in a radio frame, and f represents the f-th subcarrier in frequency-domain direction in a radio frame.

For DwPTS with 8, 9 or 10 OFDM symbols which is a punctured version of the normal subframe, the DM-RS pattern in Option-1 includes 8 REs per layer, and the 8 REs for CDM group 1 includes resource elements at R(i, f) in a radio frame, where f=2, 5, 8, 11 when i=5 or 6; for CDM group 2, f=1, 4, 7, 10 when i=5 or 6; and REs with i=9, 10, 11, 12 and f=1 to 12 are punctured.

FIG. 8 shows Option-2 for DM-RS pattern for extended CP where OCC=4. The Option-2 provides another pattern with OCC length of 4 as compared to option-1. So, some similar characteristics are maintained, e.g. 16 REs per layer, staggered structure, a subset design and unified pattern for all DwPTS cases. The difference is OCC with length of 4 is constructed in 4 adjacent resource elements. The advantage is this option can efficiently overcome the negative impact of Doppler in a high mobility environment since orthogonality between used OCCs can be relatively kept well.

For normal subframe, the DM-RS pattern in Option-2 includes 16 REs per layer, and the 16 REs for CDM group 1 includes resource elements at R(i, f) in a radio frame, where f=4, 5, 10, 11 when i=5 or 6, and f=2, 3, 8, 9 when i=11 or 12; for CDM group 2, f=1, 2, 7, 8 when i=5 or 6, and f=5, 6, 11, 12 when i=11 or 12, where i represents the i-th symbol in time-domain direction in a radio frame, and f represents the f-th subcarrier in frequency-domain direction in a radio frame.

For DwPTS with 8, 9 or 10 OFDM symbols which is a punctured version of the normal subframe, the DM-RS pattern in Option-2 includes 8 REs per layer, and the 8 REs for CDM group 1 includes resource elements at R(i, f) in a radio frame, where f=4, 5, 10, 11 when i=5 or 6; for CDM group 2, f=1, 2, 7, 8 when i=5 or 6; and REs with i=9, 10, 11, 12 and f=1 to 12 are punctured.

FIG. 9 shows Option-3 for DM-RS pattern for extended CP where OCC=2. The Option-3 provides different solution as compared to option-1/2. Total 4 CDM groups are proposed and OCC with length of 2 is proposed since up to two layers is multiplexed in a CDM group. This option has very good capability of maintaining orthogonality between used OCCs due to OCC length of 2. Less DM-RS overhead of 8 REs per layer is proposed since in extended CP, the application of more than 4 layer transmission under like VehB channel is very low. So, this overhead is good enough to obtain good detection performance under TU like channel. Still, some similar characteristics are maintained, e.g. staggered structure, a subset design and unified pattern for all DwPTS cases.

For normal subframe, the DM-RS pattern in Option-3 includes 8 REs per layer, and the 8 REs for CDM group 1 includes resource elements at R(i, f) in a radio frame, where f=5, 11 when i=5 or 6, and f=3, 9 when i=11 or 12; for CDM group 2, f=4, 10 when i=5 or 6, and f=2, 8 when i=11 or 12; for CDM group 3, f=2, 8 when i=5 or 6, and f=6, 12 when i=11 or 12; for CDM group 4, f=1, 7 when i=5 or 6, and f=5, 11 when i=11 or 12; where i represents the i-th symbol in time-domain direction in a radio frame, and f represents the f-th subcarrier in frequency-domain direction in a radio frame.

For DwPTS with 8, 9 or 10 OFDM symbols which is a punctured version of the normal subframe, the DM-RS pattern in Option-3 includes 4 REs per layer, and the 4 REs for CDM group 1 includes resource elements at R(i, f) in a radio frame, where f=5, 11 when i=5 or 6; for CDM group 2, f=4, 10 when i=5 or 6; for CDM group 3, f=2, 8 when i=5 or 6; for CDM group 4, f=1, 7 when i=5 or 6; and REs with i=9, 10, 11, 12 and f=1 to 12 are punctured.

In the present invention, the staggered patterns with DM-RS overhead of max 16 REs per layer for extended CP are provided. Three preferred optional patterns are proposed for rank 5-8 design. It may be observed that the foregoing DM-RS patterns for extended CP supporting rank 5-8 have the following advantages:

Good consistency is maintained by adopting the same design as normal CP, i.e. TDM multiplexed with control channel and Rel-8 CRS and using CDM+FDM as the basic multiplexing scheme among layers.

Detection performance based on DM-RS can be guaranteed because the pattern has good capability of capturing channel frequency domain variations in the system that extended CP could experience.

A subset design is kept as much as possible to ease UE implementation.

A unified pattern by puncturing the pattern used for normal subframe is used for all DwPTS lengths, which can further limit UE implementation complexity increasing too much.

While the present invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for performing channel estimation and detection in a Multiple-Input-Multiple-Output, MIMO, system, the method comprising:
   generating a demodulation reference signal, DM-RS, pattern for an extended cyclic prefix, CP; and
   estimating and detecting channel performance based on the generated DM-RS signal pattern,
   wherein, the DM-RS pattern includes rank 1-2 pattern which supports for up to 2 layer transmission, and
   the DM-RS pattern comprises a punctured version of normal subframe used for different downlink pilot time slot, DwPTS, cases.

2. The method according to claim 1, wherein the DM-RS pattern comprises a staggered structure for normal subframe.

3. The method according to claim 1, wherein the DM-RS pattern adopts a DM-RS overhead of max 16 resource elements, REs, per layer for an extended CP.

4. The method according to claim 1, the DwPTS cases comprises DwPTS with 8, 9 or 10 OFDM symbols.

5. The method according to claim 1, wherein an orthogonal cover code which is used for each group is constructed in time-frequency domain for both normal subframe and DwPTS.

6. A transmitter transmitting the DM-RS pattern according to claim 1.

7. A receiver receiving the DM-RS pattern according to claim 1.

8. A transmitter comprising,
   a demodulation reference signal, DM-RS, pattern generator, configured to generate a DM-RS pattern for an extended cyclic prefix; wherein,
   the DM-RS pattern includes rank 1-2-pattern which supports for up to 2 layer transmission.

9. A receiver comprising,
   a channel estimation module configured to estimating channel performance by using a demodulation reference signal, DM-RS, pattern for an extended cyclic prefix; and
   a channel detection module configured to detecting coherently by using estimated channel state information, CSI, contained in the DM-RS; wherein,
   the DM-RS pattern includes rank 1-2 pattern which supports for up to 2 layer transmission.

10. A system comprising:
    a transmitter having a demodulation reference signal, DM-RS, pattern generator, configured to generate a DM-RS pattern for an extended cyclic prefix, wherein the DM-RS pattern includes rank 1-2 pattern which supports for up to 2 layer transmission; and
    a receiver having
       a channel estimation module configured to estimating channel performance by using a demodulation reference signal, DM-RS, pattern for an extended cyclic prefix; and
       a channel detection module configured to detecting coherently by using estimated channel state information, CSI, contained in the DM-RS, wherein the DM-RS pattern includes rank 1-2 pattern which supports for up to 2 layer transmission.

* * * * *